United States Patent [19]
Wagner

[11] Patent Number: 4,768,941
[45] Date of Patent: Sep. 6, 1988

[54] FOOD PATTY AND MACHINE AND METHOD FOR MAKING THEREOF

[75] Inventor: Richard C. Wagner, Frankfort, Ill.

[73] Assignee: Hollymatic Corporation, Countryside, Ill.

[21] Appl. No.: 874,420

[22] Filed: Jun. 16, 1986

[51] Int. Cl.⁴ .............................................. A22C 7/00
[52] U.S. Cl. ...................................... 425/197; 17/32; 426/646
[58] Field of Search .................................... 17/32, 45; 425/197–199, 812

[56] References Cited

U.S. PATENT DOCUMENTS

| | | | |
|---|---|---|---|
| 2,456,778 | 12/1948 | Gilchrist | 18/42 |
| 3,376,608 | 4/1968 | Wilcox | 18/42 |
| 3,964,127 | 6/1976 | Holly | 17/32 |
| 4,272,864 | 6/1981 | Holly | 17/45 |
| 4,343,068 | 8/1982 | Holly | 17/32 |

*Primary Examiner*—Peter Chin
*Attorney, Agent, or Firm*—Wood, Dalton, Phillips, Mason & Rowe

[57] ABSTRACT

A mold plate is reciprocable between a fill position and a knock-out position and in the fill position has a mold cavity with its center line aligned with an elongate fill slot in a fill plate. A reciprocable ram in its advancing stroke forces ground meat through the elongate fill slot into the mold cavity at the center thereof for flow in opposite directions from the center line of the mold cavity for filling thereof. A pair of plates are interposed between the elongate fill slot and the mold cavity and have a closed position to prevent flow therebetween and an open position providing two rows of holes through which meat is forced into the mold cavity. One of the plates is movable in response to the advancing and retracting movement of the ram to automatically close the flow path to the mold cavity on the retracting stroke of the ram to prevent back-flow of ground meat from the mold cavity.

10 Claims, 3 Drawing Sheets

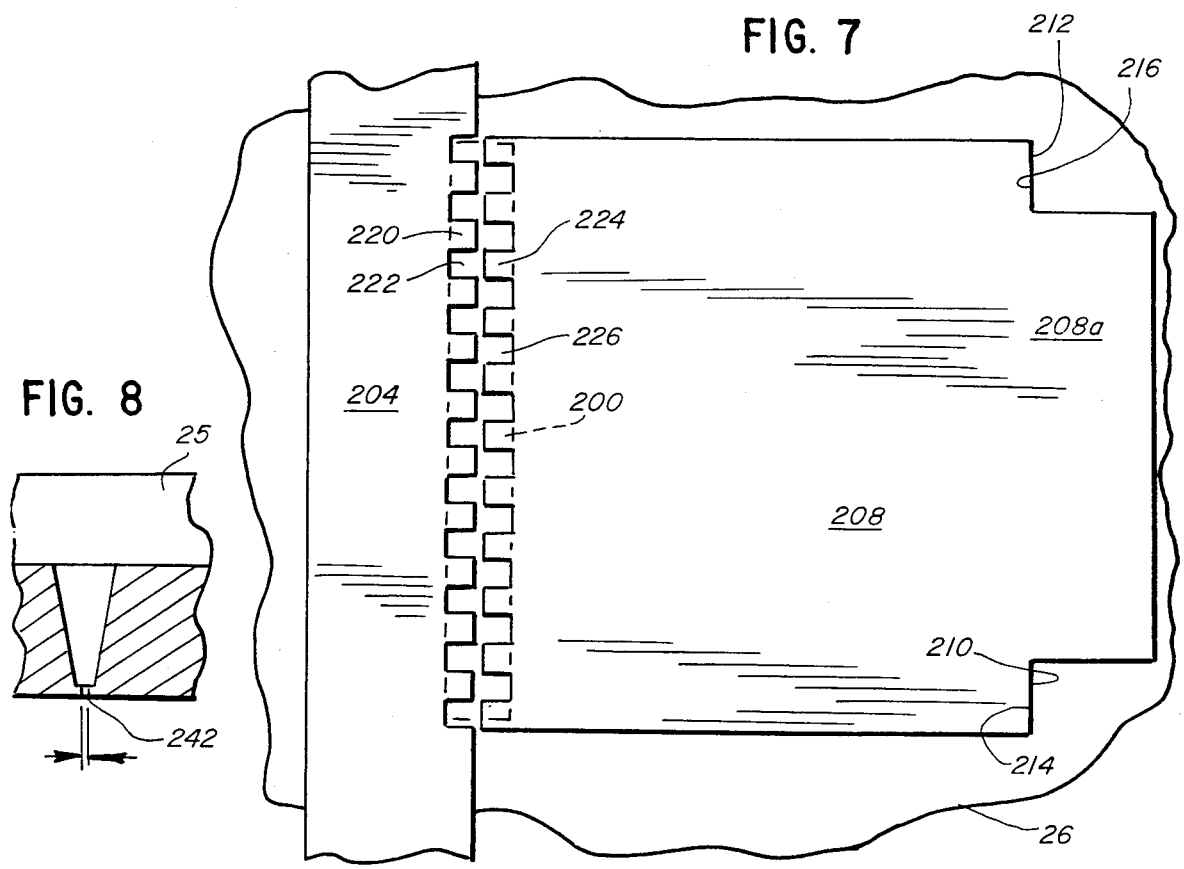
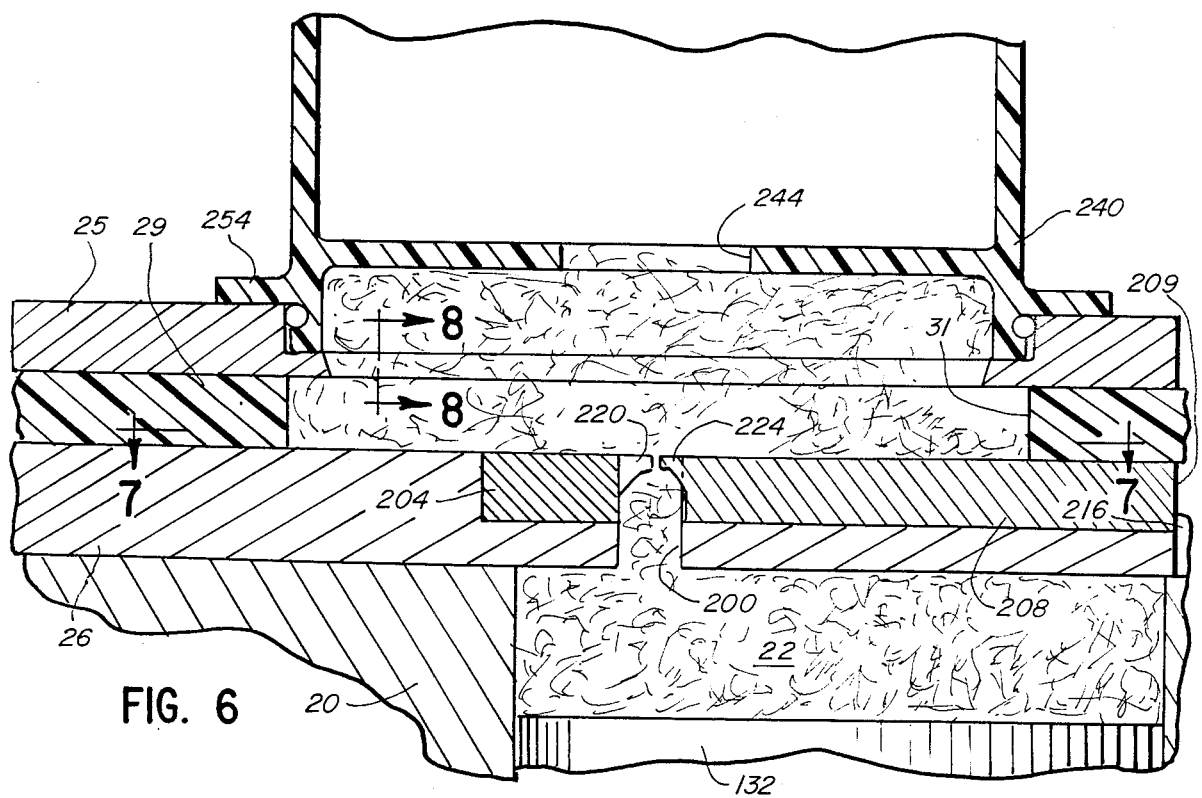

FOOD PATTY AND MACHINE AND METHOD FOR MAKING THEREOF

TECHNICAL FIELD

This invention pertains to a machine and method for making a food patty and the product produced thereby, and particularly making a hamburger patty of ground meat.

BACKGROUND ART

It is generally known in the art to have a patty molding machine, having a hopper for holding a supply of ground meat such as ground beef, which is progressively advanced to a fill position for delivery of the ground meat into one or more mold cavities in a reciprocal mold plate. Pressure is exerted on the ground meat to fill the mold cavities. After the mold cavities are filled, the mold plate is moved to a knock-out position where the patties can be forced out of the mold cavities for further handling.

The machines manufactured by the assignee of this application have been designed to fill the mold cavity from "back to front" through a fill slot adjacent the mold plate. A typical construction of this type is shown in application Ser. No. 657,254 filed Oct. 3, 1984, now U.S. Pat. No. 4,597,134, granted July 1, 1986.

The "back-to-front" method of filling a mold cavity has been used for several reasons. The fill slot acts as a "shut-off" valve, as the mold plate move a short distance away from the fill position. This is necessary because the plunger or other mechanism used to force the ground meat into the mold cavity on its advancing stroke, tends to pull the meat back out of the mold cavity on its retracting stroke until "shut-off" is obtained. A further reason relates to the "cover area", which is the distance from the front edge of the fill slot to the point where the mold cavity and the patty formed therein emerge from the enclosing top and bottom plates of the machine. This cover area must be the length of the largest diameter patty to prevent a direct path of flow of ground meat from the fill slot through the mold cavity and out the front end of the machine. Filling the mold cavity from "back-to-front" with the fill slot toward the rear of the mold cavity results in more easily achieving the desired cover area. Additionally, filling from the back of the mold cavity produces a flow pattern of ground meat and sinew therein, to achieve a compromise "cook-out" of the patty and have the final shape approximately round.

The filling of the mold cavity from "back-to-front" has disadvantages. The material that is molded such as ground beef has relatively high viscosity, which makes it susceptible to high pressure gradients during flow. Because of this, there are resulting density variations along the flow path in the mold cavity which results in an uneven "cook-out" of a product such as a hamburger patty. Additionally, it is difficult to control the flow pattern in the mold cavity to achieve a fiber alignment which will result in a round fresh patty remaining round when cooked. This is primarily due to the flow starting along a narrow path and then widening and then again narrowing when moving from the rear to the front of a mold cavity having a circular shape. Further, the time to fill the mold cavity is high because of the relatively long flow path required to fill the mold cavity.

The invention disclosed herein comprehends filling a mold cavity from a fill slot with their center lines coincident and the use of a pair of plates functioning as valve means for controlling flow of ground meat to the mold cavity. These plates have their adjacent edges formed with teeth which intermesh in a closed position and which provide two rows of holes for passage of ground meat to the mold cavity when open. One of the plates is movable in response to a pressure differential for movement between open and closed positions. The use of a pressure responsive valve plate in various types of molding apparatus including a patty forming machine are shown in Gilcrest U.S. Pat. No. 2,456,778, Wilcox U.S. Pat. No. 3,376,608, and Holly U.S. Pat. No. 4,272,864.

SUMMARY OF THE INVENTION

A feature of the invention is to provide a new and improved machine and process for molding a food patty and more particularly a hamburger patty formed from ground meat, wherein a mold cavity for molding the patty is supplied with ground meat, generally along a center line of the mold cavity and with equidistant flow in both directions from the center line of the mold cavity for complete filling of the mold cavity.

The machine and process for carrying out the invention provides a number of significant advantages. The ground meat flows from an elongate fill slot to the center line of the mold cavity and the ground meat then moves both forwardly and rearwardly in the mold cavity. The maximum travel of ground meat is one-half the distance travelled in filling from the back of the mold cavity. This reduces the time to fill, which is particularly critical in a high speed machine.

The filling from the center line of the mold cavity is also more desirable because filling is done from the wide dimension of a round patty to the narrow dimension, instead of filling at a narrow dimension which changes to wide and then again narrow when filling from the back edge of the mold cavity. An additional important advantage derived from the structure of the invention is in the simplified manufacture of mold plates having different sizes of mold cavity for different size patties. The different sizes can all be made based upon the same center line position when the mold plate is in a fill position. There is a symmetrical method of filling, which results in a more uniform end product, and with minimum shrinkage of the patty from the molded round shape and size after cooking.

A further feature of the process and machine is the filling of the mold cavity by flow of ground meat through a series of holes to cause strands of ground meat to flow into the mold cavity to break up the flow pattern to the mold cavity, and resultingly produce a more tender cooked produce, and which also reduces the tendency of aligned sinew in the patty, which adversely affects the shape of the final cooked product.

The structure providing the holes for flow of meat to the mold cavity is provided by a novel structure including a pair of plates with one plate being movable relatively to the other between open and closed position, and each of these plates has a series of teeth along the edge thereof, which are staggered one relatively to the other, whereby the teeth can intermesh to prevent passage of ground meat through the fill slot when the plates are in a closed position. When the plates are in open position, the rows of teeth are spaced from each other to define the holes through which ground meat can flow. The plates define valve means for controlling flow of ground meat to the mold cavity. The movable plate moves to an open position wherein there is a slight clearance between the two rows of teeth whereby there can be movement of sinew through the clearance rather than the sinew plugging the series of holes between the teeth. This movement of sinew is facilitated by the movement of the movable plate to dislodge any sinew which might tend to lodge and tangle about the teeth.

Reference herein is made to ground beef in the formation of hamburger patties; however, it will be evident that the disclosed invention applies equally to formation of patties from any food product containing material that tends to cook to a misshapen form.

BRIEF DESCRIPTION OF THE DRAWINGS

FIG. 6 is a fragmentary sectional view taken generally along the line 6—6 in FIG. 1 on an enlarged scale and illustrating the filling of a mold cavity;

FIG. 7 is a plan section taken generally along the line 7—7 in FIG. 6; and

FIG. 8 is a fragmentary section taken generally along the line 8—8 in FIG. 6.

BEST MODE FOR CARRYING OUT THE INVENTIONS

Figures 1, 2, 4, 5:
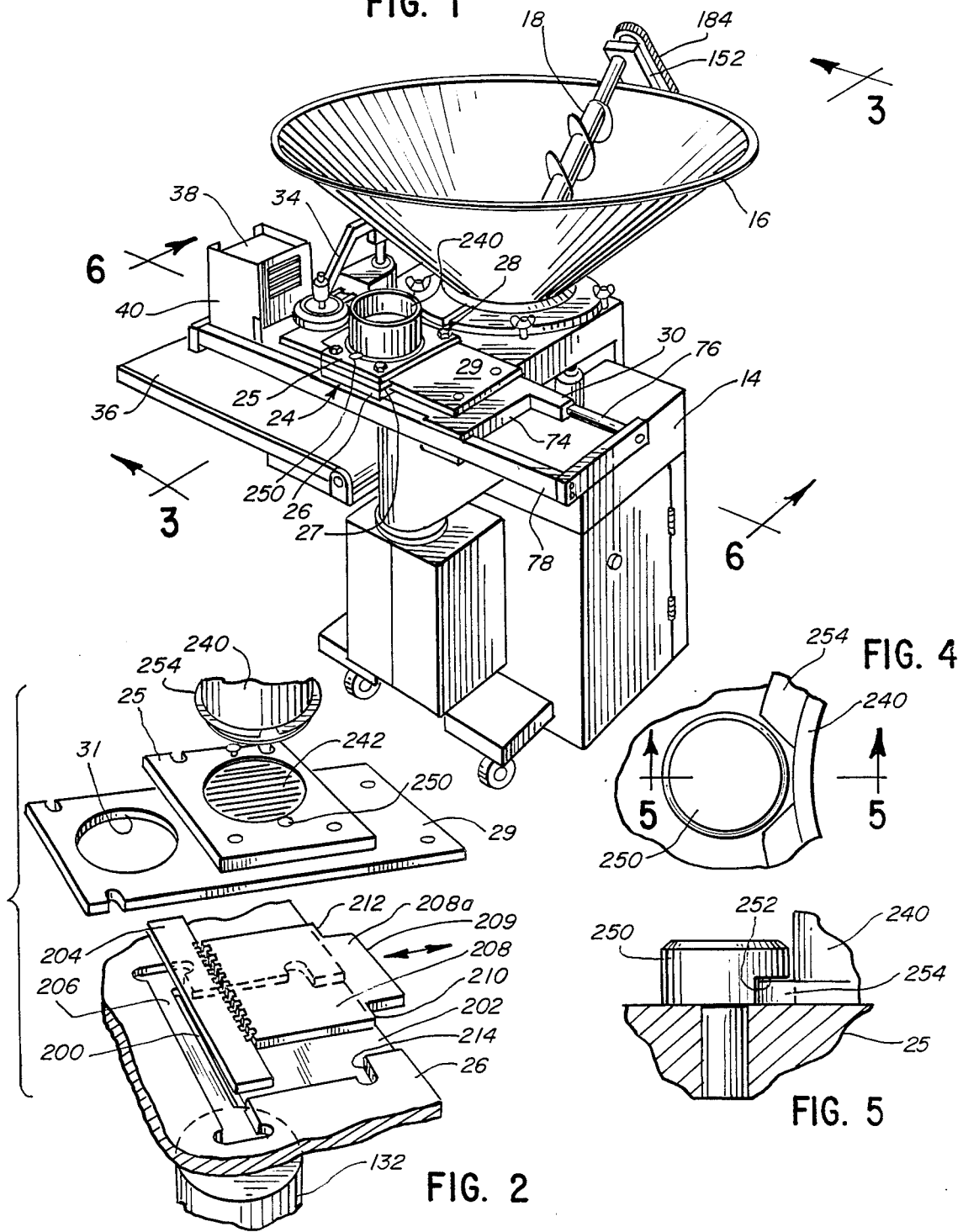
FIG. 1 is a perspective view of the patty molding machine.
FIG. 2 is an exploded perspective view of a plurality of components of the patty molding machine.
FIG. 4 is a detailed view of a portion of an accumulator and locking means therefore.
FIG. 5 is a vertical section taken generally along the line 5—5 in FIG. 4.
Figure 3:
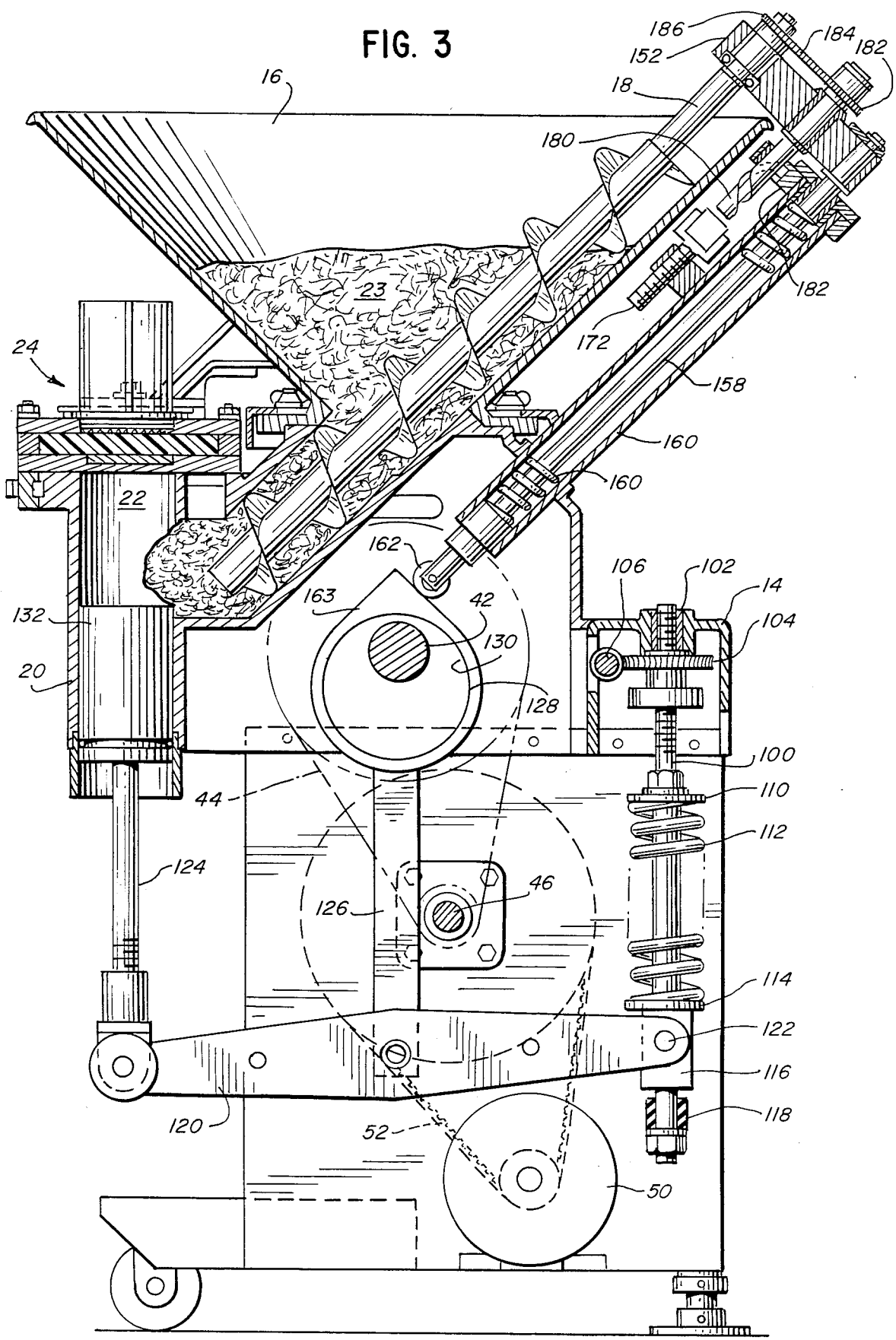
FIG. 3 is a vertical section taken generally along the line 3—3 in FIG. 1 and on an enlarged scale.

The patty molding machine is shown generally in FIGS. 1 and 3 and is generally of the same construction as the machine shown in my previously referred to application Ser. No. 657,254 filed Oct. 3, 1984, now U.S. Pat. No. 4,597,134, granted July 1, 1986. The disclosure thereof is incorporated herein by reference.

The patty molding machine has a base 14 supporting a hopper 16 thereon in which large quantities of the product to be formed into patties, such as ground beef, may be placed. The hopper 16 is preferably in the shape of an inverted cone and has an auger 18 therein extending substantially along the inner wall of the hopper. A ram housing 20 defines a chamber 22 into which the ground meat 23 can be fed by the auger 18 to be positioned for subsequent formation into patties Located above the ram housing 20 is a molding station 24. The molding station has a top plate 25 and a fill plate 26 fixed to the base 14 in spaced apart relation by a pair of spacers 27 one at each side and fastening members 28. A mold plate 29 is reciprocally movable between the top plate 25 and the fill plate 26 by means of a mold plate carrier 30 reciprocally mounted on the base 14. The mold plate 29 has a mold cavity 31 which can move between a fill position at the molding station 24 and a knock-out position where a vertically reciprocating knockout 34 is mounted for vertical movement to force a molded patty out of the mold cavity 31 and onto a conveyor 36. A paper from a supply of patty separating papers 38 can be fed by a paper feed 40 onto the top of each patty advancing along the conveyor 36 to insure that a stack of patties do not stick together.

The mold plate 29 is shown as having a single mold cavity 31. However, it is within the scope of the invention to have a plurality of transversely aligned mold cavities in the mold plate whereby a plurality of patties can be formed at the molding station 24.

The movements of the components of the patty molding machine are derived from a rotor drive shaft 42 in order to achieve synchronization of the various cooperating mechanisms of the patty molding machine. The rotor drive shaft 42 is driven by a rotor chain 44 which is driven from an intermediate drive shaft 46. The intermediate drive shaft 46 is driven by a motor 50 through a connecting tooth belt 52.

The rotor drive shaft 42 has a knock-out cam and a paper feed cam (not shown) to appropriately drive the knock-out 34 and the paperfeed mechanism 40 in conjunction with the other machine operations. Any suitable driving connection to the knock-out 34 and paperfeed mechanism 40 can be used and, as these structures do not form a part of the present invention, the driving connections are not illustrated.

The hopper 16 is rotatably mounted on the base 14 to have the product 23 mixed and moved to the auger 18 with the rotation of the hopper being by gearing connections to the rotor drive shaft 42. These drive connections are not shown and reference may be made to my copending application for a more complete disclosure thereof.

The mold plate carrier 30 includes a drive shuttle 74 which reciprocates the mold plate 29 between the molding station and the knock-out station. The drive shuttle is guided by a fixed guide rod 76 and a guide rail 78. The drive for the drive shuttle 74 is derived from a barrel cam (not shown) which is fixed to the rotor drive shaft 42 for rotation therewith. Reference may be made to my prior copending application for a specific disclosure of the drive connection between the barrel cam and the drive shuttle 74. The drive connection includes a barrel cam follower fixed to a vertical shaft and a lever arm fixed to the vertical shaft which connects to the drive shuttle.

The ram structure of the patty molding machine includes a ram stroke adjusting rod 100 supported and pending from the base 14 by a threaded connection 102. The adjusting rod 100 has a gear 104 which engages a worm 106 associated with a hand wheel which can be rotated to rotate the adjusting rod 100 and therefore adjust it up or down at the threaded connection 102.

The adjusting rod 100 has an upper shoulder 110 geared thereto against which one end of a compression spring 112 abuts. The other end of the compression spring abuts on a lower shoulder 114 which is secured to a sleeve 116 slidably mounted on the adjusting rod 100. The compression spring 112 acts to bias the sleeve 116 against a bumper 118 fitted to the lower end of the adjusting rod 100.

A ram drive arm 120 is pivotally mounted at a sleeve pin 122 on the sleeve 116 at one end thereof and is pivotally connected to a ram rod 124 at its other end. An arm 126 follows an eccentric sleeve 128 located around a drive eccentric 130 on the rotor drive shaft 42. The eccentric arm 126 therefore is driven up and down by rotation of the eccentric. The compression spring 112 holds the one end of the ram drive arm 120 centrally stationary whereby the arm 120 pivots about the sleeve pin 122 to reciprocate the ram rod 124 up and down. This results in a ram 132 on the ram rod 124 being reciprocated in the chamber 22 forcing product 23 upwardly within the chamber on its upward stroke and being retracted on its downward stroke to a position where product 23 can be fed into the chamber by the auger 18.

The worm 106 can be manually rotated to raise or lower the sleeve pin 122 in order to lower or raise one end of the ram stroke. Additionally, the compression spring 112 limits the pressure exerted by the ram 132 on its upward stroke.

The auger 18 has both rotational and axial movement. The auger 18 moves axially in advancing the ground meat into the chamber 22 and in its retracting movement moves both axially and rotationally.

The upper end of the auger 18 is mounted to an end plate 152 for axial movement therewith and for relative rotation. A reciprocable drive rod 158 is rigidly secured to the end plate 152 and is received within a tubular housing 160 secured to the base 14. The lower end of the drive rod has a rotor 162 positioned to ride on a cam 163 fixed to the rotor shaft 42. The compression spring 166 is associated with the drive rod 158 and acts to bias the auger 18 downwardly toward the chamber 22. Axial reciprocation of the auger is controlled by rotation of the cam 163. An adjustable stroke stop 172 has a rubber bumper and can act to limit the downward stroke of the auger 18 by abutment with a cam member 180 carried by the end plate 152. The cam member 180 is mounted for rotation with respect to the end plate 152 and has a sprocket 182 driving a chain 184 connected to an auger sprocket 186. The cam member 180 has a helical cam track which coacts with a roller in a member 182 fixed to the housing whereby axial movement of the auger 18 results in rotation of the cam member 180 to rotate the gear 182 and thus rotate the auger 18. However, there is a one-way clutch associated with the gear 182 which transmits rotation to the auger 18 only in the retracting stroke thereof. A one-way clutch associated with the gear 186 precludes rotation of the auger during axial advance thereof.

The foregoing description relates generally to the basic patty molding machine as disclosed in my previously referred to copending application.

The invention pertains to improvements in my prior machine in method and apparatus for molding a patty, such as a hamburger patty of ground beef, and the resulting hamburger patty.

The fill plate 26 has an elongate fill slot 200 which opens to a recess 202 in the upper side of the fill plate which mounts a pair of plates which function as valve plates and also to form the flow of ground meat into the mold cavity 31. These plates include a fixed plate 204 fitted within a section 206 of the recess 202 and a movable plate 208 having a section 208a of reduced width with an edge 209 to provide a pair of shoulders 210 and 212 which coact with stop surfaces 214 and 216 on the fill plate 26 to limit movement of the plate 208 in one direction. The fixed plate 204 has a row of spaced teeth 220 providing a row of holes 222 between adjacent teeth 220. The movable plate 208 has a series of spaced apart teeth 224 providing a row of holes 226 between adjacent teeth 224. The teeth 220 of the fixed plate 204 align with the holes 226 of the movable plate 208. With the movable plate 208 in its retracted position as shown in FIGS. 6 and 7, both rows of holes 222 and 226 are open to permit flow of ground meat from the chamber 22 through the fill slot 200 into the mold cavity 31. The stops 214 and 216 on the fill plate 26 are located to permit the movable plate 208 to retract to a position wherein there is also a slight gap between the two rows of holes 222 and 226 to allow any long sinew to pass through the fill slot 200 with part of the meat rather than tangle between the rows of holes.

As shown, the holes 222 and 226 are generally square in cross section to form strands of ground meat which flow into the mold cavity 31. Flow of ground meat into the mold cavity 31 is facilitated by the curved underside of the teeth 220 and 224 as seen in FIG. 6.

The fixed plate 204 and movable plate 208 serve as valve means whereby flow through the elongate fill slot 200 is prevented when the movable plate 208 has moved to the left from the position shown in FIGS. 6 and 7 to cause interfitting of its teeth 224 with the teeth 220 of the fixed plate 204 by moving into the row of holes 222. At the same time, the openings 226 move into closing relation with the teeth 220 on the fixed plate 204.

The action of the ram 132 controls the movement of the movable plate 208. As the ram moves upwardly to force meat through the elongate fill slot 200, pressure is exerted on an edge of the movable plate 208 with the opposite edge thereof being exposed to atmosphere. The pressure exerted by the ground meat results in a force greater than atmospheric pressure force at the opposite edge to cause the movable plate 208 to move to the open position shown in FIGS. 6 and 7. On the retracting stroke of the ram 132, a vacuum is created within the chamber 22 whereby the force resulting from atmospheric pressure acting on the exposed edge 209 of the movable plate 208 causes the movable plate 208 to move to its interfitting position with the fixed plate 208 in the closed position.

The timing of the reciprocation of the mold plate 29 and the ram 132 is established to have the pressure stroke of the ram 132 occur when the mold plate 29 is at an end of its stroke and has the transverse center line of the mold cavity 31 aligned with the center line of the elongate fill slot 200. This provides for filling to the center line of the mold cavity 31 regardless of whether the mold cavity is circular or of another shape and the ground meat can move both forwardly and rearwardly from the center line to fill the mold cavity. This reduces the path of travel for meat to fill the mold cavity and thus reduces the fill time and filling is done from the widest part of the mold cavity to the narrowest part.

The top plate 25 is recessed to hold a tubular accumulator 240 and has a series of narrow slits 242 which overlie the mold cavity 31 when in fill position to permit escape of air from the mold cavity. Any ground meat that should pass through the slots 242 can enter into the accumulator through an opening 244 in the bottom thereof. The accumulator can be removed for removal of ground meat and cleaning and is releasably held on the top side of the top plate 25 by means of a pair of rotatable lock members 250, one of which is shown in FIGS. 4 and 5 and which has a recess 252 formed in the head thereof for receiving a flange 254 on the accumulator for releasably holding the accumulator.

In a sequence of operation, the mold plate 29 moves into position with the center line of the mold cavity 31 aligned with the center line of the elongate fill slot 200. The ram 132 forces the ground meat up toward the mold cavity 31 and exerts pressure to open the movable plate 208. As an example, an opening force on the movable plate 208 would be on the order of 130 lbs. for molding pressures of 60 psi. The ground meat moves through the two rows of holes 222 and 226 into the mold cavity. The movement through the series of holes tends to break up the flow pattern to produce a more tender cooked product and also reduces the tendency to have aligned sinew in the hamburger patty which influences the final cooked shape. The movement of the sliding plate to a position wherein there is a slight gap between the rows of teeth 220 and 224 assist in avoiding plugging of the two rows of holes by a combination of the movement of the plate as well as a slight gap created. There is action tending to dislodge any sinew which would tangle between the holes.

On the retracting stroke of the ram 132 a vacuum is created at the fill slot 200 and the sliding plate 208 is caused to close by a force at the edge 209 resulting from atmospheric pressure which can be in the order of 20 to 30 lbs. This closing action assures that there will be no backflow of ground meat from the mold cavity and thus it is not necessary to fill the mold plate "back-to-front" and have the mold plate move to form a closure to prevent flow of ground meat out of the mold cavity. The closing movement of the movable plate 208 also helps to free any sinew which would tend to entangle onto the two rows of teeth 220 and 224. The filling of the mold cavity at the center line thereof also simplifies manufacturing of mold plates since the mold cavity therein will always have its center line aligned with the center line of the fill slot and is not necessary to take into account the action of the mold plate in closing the fill slot.

As will be evident from the foregoing, there has been disclosed herein a method of molding a patty of ground meat wherein a mold plate is reciprocated between a patty discharge position and a fill position to have a mold cavity positioned to receive ground meat, ground meat is advanced through an elongate narrow fill slot with the fill slot having a center line aligned with the center line of the mold cavity to have ground meat flow into the mold cavity centrally thereof and then outwardly from the center line in opposite directions to completely fill the mold cavity. More specifically in the foregoing method, the ground meat is formed into a plurality of strands by passage through a row of holes extending parallel to the elongate fill slot.

I claim:

1. A patty molding machine comprising, a base having a vertically extending chamber of holding ground meat, a fill plate on said base and overlying said chamber, an elongate fill slot in said fill plate for passage of ground meat forced from said chamber, a movable mold plate positioned at a side of said fill plate opposite said chamber, a mold cavity in said mold plate, means for reciprocating said mold plate between a knock-out position wherein a patty can be moved out of the mold cavity and a fill position wherein the mold cavity and the fill slot have their transverse center lines in alignment, means for cyclically advancing ground meat in said chamber through said fill slot with an advancing cycle commencing when said mold plate is in fill position, and movable means including a toothed member operable in a closed position to block flow of meat through the fill slot and in a second position defining a row of holes with the row extending transversely of the fill slot for forming strands of meat which flow into the mold cavity and with flow of ground meat both rearwardly and forwardly in the mold cavity to fill the mold cavity.

2. A patty molding machine as defined in claim 1 wherein there are two rows of said holes with the holes in the two rows staggered relative to each other.

3. A patty molding machine as defined in claim 2 wherein said movable means defining said two rows of holes includes a pair of plates with one plate being said toothed member each having a row of teeth and positioned between the fill plate and the mold plate.

4. A patty molding machine as defined in claim 3 including a top plate overlying said mold plate and connected to said fill plate, a series of air release slots in said top plate overlying said mold opening when the mold is in fill position, and a removable accumulator covering said air release slots.

5. A patty molding machine as defined in claim 3 wherein one of said pair of plates is a slidable plate having an edge exposed to the exterior of the machine, said rows of holes are defined by a row of spaced-apart teeth on an edge of each of said pair of plates, said rows of teeth being staggered relatively to each other whereby said pair of plates in said closed position have the rows of teeth interfitting to close said holes and prevent meat flow through the fill slot, and the underside of the teeth being recessed such that pressure created by advancing ground meat can act against an edge of the slidable plate having the row of teeth and by a pressure greater than atmospheric cause the movement of the slidable plate and opening of the holes and said slidable plate is closed by atmospheric pressure by a vacuum in said chamber as said cyclically advancing means is retracting.

6. A patty molding machine comprising, a chamber for holding a supply of ground meat, a member closing off an end of said chamber and having an elongate fill slot, reciprocal means in said chamber for forcing ground meat through said fill slot in movement thereof toward the fill slot, a mold plate having a mold cavity movable along said member between a fill position with the center line of the mold cavity aligned with the center line of the fill slot and a knock-out position remote from the fill slot where a formed patty can be removed from the mold cavity, and valve means operable to control the flow of ground meat through said fill slot including a pair of valve plates each having teeth which interlock when closed, means movably mounting one valve plate for movement away from the other to separate said teeth to form holes aligned with the fill slot for flow of meat therethrough, and said movable valve plate having pressure responsive means responsive to movement of said reciprocal means for causing movement thereof.

7. A patty molding machine as defined in claim 6 wherein said movable plate has a pair of opposed surfaces with one surface exposed to atmosphere and the other surface exposed to ground meat in the flow path from the chamber to the mold cavity whereby the movable valve plate moves in response to a difference in pressure acting on said surface.

8. A patty molding machine as defined in claim 6 wherein said teeth are generally square in plan to provide generally square holes between teeth of a plate when the valve plates are separated.

9. A patty molding machine as defined in claim 8 including a stop for limiting the separating movement of the movable valve plate to a position wherein the teeth of the valve plates are spaced apart to provide a slight gap between the outer ends of the teeth.

10. A patty molding machine as defined in claim 8 wherein said teeth are curved on their underside.

* * * * *